United States Patent Office 2,888,485
Patented May 26, 1959

2,888,485

PREPARATION OF DIPHENIC ACID

Philip S. Bailey, Austin, Tex., assignor, by mesne assignments, to Esso Research and Engineering Company, Elizabeth, N.J., a corporation of Delaware No Drawing. Application May 14, 1956
Serial No. 584,427

8 Claims. (Cl. 260—523)

This invention is directed to a process for the preparation of 2,2'-biaryldicarboxylic acids. More particularly, the present invention is directed to a process for preparation of 2,2'-bicaryldicarboxylic acids such as diphenic acid from ozonization products of phenanthrene compounds.

In application Serial No. 584,461, now U.S. Patent No. 2,851,465 of Phillip S. Bailey, filed of even date herewith, there is disclosed a process for the preparation of ω-(2'-formyl-2-biaryl)-ω-alkoxymethyl hydroperoxides by the ozonization of phenanthrene compounds in suspension in $C_1$ to $C_{10}$ aliphatic alcohols.

In accordance with the present invention such a hydroperoxide, either in solution in the parent aliphatic alcohol or in solution in any other suitable polar organic solvent, is contacted with a reducing agent whereby there is formed a 2,2'-biaryldicarboxaldehyde.

The dialdehyde is recovered from the reaction mixture and then brought into contact with an oxidizing agent in solution in a polar organic solvent to form a 2,2'-biaryldicarboxylic acid.

When the hydroperoxide starting material is derived from phenanthrene, the dicarboxylic acid is diphenic acid. Diphenic acid and similar dicarboxylic acids, obtainable by the process of the present invention are useful for a wide variety of purposes. They may be used, for example, as intermediates in the preparation of plasticizers and, in the form of their anhydrides, for the preparation of polyamides, polyesters, etc.

There is used as a starting material for the present invention an ω-(2'-formyl-2-biaryl)-ω-alkoxymethol hydroperoxide reaction product formed by the ozonization of a phenanthrene compound in a $C_1$ to $C_{10}$ aliphatic alcohol as described in the aforesaid application Serial No. 584,461, such hydroperoxide having the formula (I)

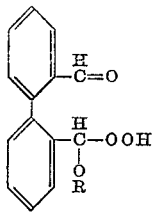

wherein R is selected from the group consisting of $C_1$ to $C_{10}$ alkyl groups.

When the hydroperoxide is derived from phenanthrene, the aryl groups of the hydroperoxide will be unsubstituted, as shown in the formula. It will be understood that when the hydroperoxide is derived from a substituted phenanthrene, the aryl groups in the above formula will be correspondingly substituted.

Thus, there may be used a hydroperoxide derived from phenanthrene or a substituted phenanthrene or a mixture of two or more such peroxides. Representative substituted phenanthrenes include retene (1-methyl-7-isopropylphenanthrene), 3-methylphenanthrene, 1-methylphenanthrene, 2-methylphenanthrene, 4-methylphenanthrene, 1-propylphenanthrene, 2-propylphenanthrene, 1-butylphenanthrene, pinanthrene (1,7-dimethylphenanthrene), 1-ethyl-2-methylphenanthrene, 1-butyl-2-methylphenanthrene, 3-ethyl-5-methylphenanthrene, 3-ethyl - 6 - methylphenanthrene, 1,2,8 - trimethylphenanthrene, 1-ethyl-7-isopropylphenanthrene, 1,2,7-trimethylphenanthrene, 1,2,6-trimethylphenanthrene, 2-isopropyl-1,7,8-trimethylphenanthrene, 1-phenylphenanthrene, 2-phenylphenanthrene, 2-phenanthrenecarboxylic acid, 3-phenanthrenecarboxylic acid, 2 - phenanthrenesulfonic acid, 2-nitrophenanthrene, 3-nitrophenanthrene, 2-acetylphenanthrene, 3-acetylphenanthrene, 1,7-phenanthrenedicarboxylic acid.

A preferred class of phenanthrene compounds from which the hydroperoxide starting materials for the present invention may be derived include phenanthrenes having the formula:

(II)

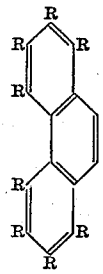

wherein R is selected from the group consisting of hydrogen and alkyl and aryl groups.

In this situation, the hydroperoxide will have the formula (III)

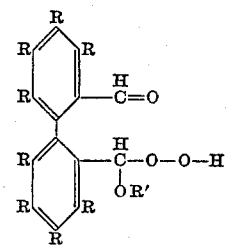

Wherein R is selected from the group consisting of hydrogen and alkyl and aryl groups, and
Wherein R' is selected from the group consisting of $C_1$ to $C_{10}$ alkyl groups.

In accordance with the present invention a hydroperoxide having the Formula I, supra, or preferably having the Formula III supra, is contacted in solution in a nonreactive polar organic solvent with a suitable reducing agent whereby there is formed a 2,2'-biaryldicarboxaldehyde; such dialdehyde having the formula (IV)

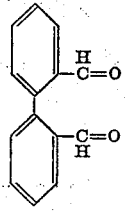

It will be understood that in the foregoing Formula IV the aryl groups will be unsubstituted when the hydroperoxide is derived from phenenthrene but will be correspondingly substituted when the hydroperoxide starting material is derived from a substituted phenanthrene.

The polar organic solvent to be employed may be an alcohol, ketone, ether, etc., or a mixture of two or more miscible solvents of this nature. Representative solvents of this nature which are, in general, non-reactive with reducing agents of the present invention, include $C_1$ to $C_{10}$ aliphatic alcohols such as methanol, ethanol, propanol, butanol, amyl alcohol, hexyl alcohol, heptyl alcohol, octanol, nonyl alcohol; ketones such as acetone, methylethylketone, diethylketone, methylpropylketone, methylisopropylketone, cyclohexanone, etc.; ethers such as diethyl ether, isopropyl ether, dioxane, acetic acid, etc. It is preferable to use an amount of solvent such that there is provided from about 0.1 to about 10 mols of hydroperoxide per liter of solvent. Preferably, the polar organic solvent is the $C_1$ to $C_{10}$ aliphatic alcohol solvent utilized for the preparation of the hydroperoxide from the phenanthrene compound. If such an alcohol is employed as the polar organic solvent, the hydroperoxide may be treated without extraction in the reaction mixture prepared by the ozonization of the phenanthrene compound from which it is derived.

A wide variety of reducing agents may be used in accordance with the present invention, alone or in compatible admixture. Thus, for example, reducing agents such as sodium iodide, potassium iodide, magnesium iodide, calcium iodide, barium iodide, lithium iodide, ammonium iodide, strontium iodide, secium iodide, rubidium iodide, sulfur dioxide, sodium bisulfite, sodium sulfite, lithium aluminum hydride, and other similar metal hydrides may be added to the hydroperoxide solution. At least a chemically equivalent amount of such a reducing agent should be employed. As another alternative, the hydroperoxide solution may be brought into contact with a hydrogenation catalyst such as finely divided metallic nickel, palladium, platinum, etc. in the presence of hydrogen.

The reduction reaction should be conducted at a temperature within the range of about —100° to about 30° C. Generally speaking it is preferable to employ a temperature of about 0° to —60° C. when an alcoholic solvent is employed or to employ a temperature of about 0° to about 30° C. when a non-alcoholic polar organic solvent, such as a ketone, is employed.

When the reduction reaction has gone to completion there is formed a solution of a 2,2'-biaryldicarboxaldehyde in the polar organic solvent, which dialdehyde is recovered therefrom in any suitable manner, such as by removal of the solvent (e.g., by evaporation), by precipitation of the aldehyde with a suitable precipitation agent such as water, etc., or by other suitable means.

The recovered dialdehyde is then dissolved in a suitable amount of a non-reactive polar organic solvent of the type described above such as an aliphatic alcohol, a ketone such as acetone, methylethylketone, etc. and brought into contact with at least a chemically equivalent amount of an oxidizing agent whereby there is obtained a 2,2'-dicarboxylic acid having the formula (V)

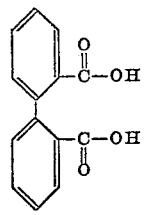

In Formula V, supra, the aryl groups will be unsubstituted when the dicarboxylic acid is derived from an unsubstituted dialdehyde and will be correspondingly substituted when the dicarboxylic acid is derived from an aryl substituted dialdehyde. Unsatisfactory results are obtained with respect to the oxidation reaction if the dialdehyde is oxidized in the presence of by-products from the previously described reduction reaction and, hence, a recovered dialdehyde should be employed for the oxidation step.

Any suitable oxidizing agent may be used, such as hydrogen peroxide under acidic, alkaline or neutral conditions; silver oxide; Tollen's reagent (silver ammonia hydroxide or silver ammonia salts); Fehling's solution; Benedict's solution and other similar cupric complex oxidizing agents; ferric chloride or nitrate or sulfate; potassium ferricyanide; sodium peroxide; barium peroxide; etc. There may also be employed under anhydrous conditions an ozone-containing gas such as a mixture of ozone with oxygen or air. As a further illustration, the dialdehyde may be treated in solution in a non-alcoholic polar organic solvent with a reagent such as, for example, potassium permanganate, potassium dichromate, chromic acid, nitric acid or Caro's acid. The potassium dichromate should be employed under non-alkaline conditions only.

The oxidation reaction is preferably conducted at an elevated temperature such as, for example, a temperature within the range from about 50° to about 100° C. Generally speaking, it is preferable to employ reflux temperatures.

The invention will be further illustrated by the following specific examples which are given by way of illustration and not as limitations on the scope of this invention.

PREPARATION OF 2,2'-BIARYLDICARBOXALDEHYDES

Example 1

Add about 5.4 grams (0.03 mol) of the phenanthrene to about 125 milliliters of substantially pure, substantially anhydrous methanol. Reflux the mixture to dissolve the phenanthrene in the methanol and then cool the solution to a temperature of about —20° C. to precipitate the phenanthrene in finely divided form. Pass a mixture of oxygen and ozone containing about 4 weight percent of ozone through the suspension at a rate of about 17 liters per hour until a clear solution is formed. This normally requires about 2 hours. During this time substantially all of the ozone is absorbed; a total of from about 1.1 to about 1.2 mols of ozone per mol of phenanthrene being absorbed. Sweep the reaction mixture with dry oxygen to remove unreacted ozone.

After the unreacted ozone has been removed add about 20 grams of sodium iodide and about 20 grams of glacial acetic acid. An exothermic reaction is initiated. Continue the reaction for about 30 minutes, at which time the temperature of the reaction mixture approximates room temperature. Next, reduce the iodine in the reaction mixture with a 10% thiosulfate solution and evaporate the methanol. As the methanol is removed a solid crystalline precipitate is formed. Prior to removal of all the methanol add water to the unevaporated reaction mixture and filter. There is obtained on recrystallization from 70% ethanol alcohol an 84% yield of 2,2'-biphenyldicarboxaldehyde (melting point 63–64° C.), having the formula (VI)

When an equivalent amount of retene is substituted for the phenanthrene and Example I is otherwise repeated, there is obtained 3-methyl-4'-isopropyl-2,2'-biphenyldicarboxaldehyde, having the formula (VII)

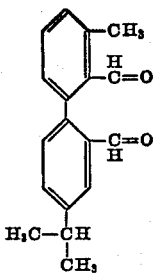

Similarly, when the phenanthrene of Example 1 is replaced with an equivalent amount of 3-methylphenanthrene and the example is otherwise repeated, there is obtained as the product 5-methyl-2,2'-biphenyldicarboxaldehyde, having the formula (VIII)

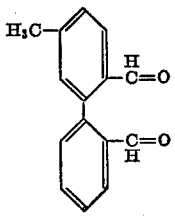

*Example II*

2,2'-biphenyldicarboxaldehyde is also prepared when about 0.5 gram of extracted ω-(2'-formyl-2 biphenyl)-ω-methoxymethyl hydroperoxide is dissolved in about 10 ml. of acetone to form a solution which may be reduced with 2 grams of sodium iodide and 1 ml. of glacial acetic acid, as described in Example I.

*Example III*

Dissolve about 1.1 grams of 2,2'-biphenyldicarboxaldehyde in about 15 ml. of methanol and cool the resultant solution to about 0° C. Pass a mixture of ozone and oxygen containing 4 weight percent of ozone through the cooled solution until the absorption of ozone ceases. Slightly in excess of about 2 mols of ozone per mol of 2,2'-biphenyldicarboxaldehyde is absorbed. Partially evaporate the methanol and then add water to form a precipitate. The product is diphenic acid (M.P. 216–222° C.).

*Example IV*

Add about 1 gram of the extracted 2,2'-biphenyldicarboxaldehyde of Example I, about 10 ml. of a 30% aqueous solution of hydrogen peroxide and about 20 ml. of a 10% aqueous solution of sodium hydroxide to about 30 ml. of ethanol and reflux the resultant mixture for about 30 minutes. At the end of this time acidify with dilute hydrochloric acid, dilute with about an equal volume of water and cool to room temperature. There is obtained, as a precipitate, about a 90% yield of diphenic acid (M.P. 223–228° C.).

When an equivalent amount of 3-methyl-4'-isopropyl-2,2'-biphenyldicarboxaldehyde is substituted for the 2,2'-biphenyldicarboxaldehyde and Example IV is otherwise repeated, 3-methyl-4'-isopropyl-2,2'-biphenyldicarboxylic acid is obtained as the product, such acid having the formula (IX)

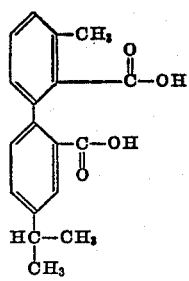

Similarly, when the 2,2'-biphenyldicarboxaldehyde is replaced with an equivalent amount of 5-methyl-2,2'-biphenyldicarboxaldehyde, and Example IV is otherwise repeated, 5-methyl-2,2'-biphenyldicarboxylic acid is obtained as the product, such acid having the formula (IX)

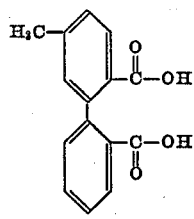

What is claimed is:

1. A process for preparing a 2,2'-biaryldicarboxylic acid which comprises the steps of bringing into contact with a chemical reducing agent in solution in a polar organic solvent at a temperature within the range of about −100° to about 30° C. a compound having the formula

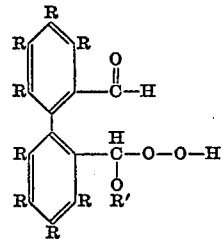

wherein R is selected from the class consisting of hydrogen, $C_1$ to $C_4$ alkyl groups, and phenyl groups, and wherein R' is a $C_1$ to $C_{10}$ alkyl group, to thereby reduce said compound to the corresponding 2,2'-biaryldicarboxaldehyde, contacting said dialdehyde with a chemical oxidizing agent in solution in a polar organic solvent at a temperature within the range of about 50° to 100° C. to oxidize said dialdehyde to the corresponding 2,2'-biaryldicarboxylic acid and recovering said 2,2'-biaryldicarboxylic acid, said solvent being selected from the class consisting of aliphatic $C_1$ to $C_{10}$ alcohols, ketones, and ethers.

2. A method as in claim 1 wherein the methoxymethyl hydroperoxide is ω-(2'-formyl-2-biphenyl)-ω-methoxymethyl hydroperoxide.

3. A process for preparing diphenic acid which comprises contacting a polar organic solvent solution of from about 0.1 to 10 mols per liter of solvent of ω-(2'-formyl-2-biphenyl)-ω-methoxymethyl hydroperoxide with a chemical reducing agent at a temperature within the range of about −100° to about 30° C. to reduce said hydroperoxide to the corresponding 2,2'-biaryldicarboxaldehyde, contacting a solution of about 0.1 to 10 mols of said dicarboxaldehyde per liter of a polar organic solvent with a chemical oxidizing agent at a temperature within the range of about 50° to about 100° C. to oxidize said dialdehyde to diphenic acid and recovering said diphenic acid, said solvent being selected from the group consisting of aliphatic $C_1$ to $C_{10}$ alcohols, ketones, and ethers.

4. A method as in claim 3 wherein an alcohol is employed as the solvent and wherein the hydroperoxide is reduced at a temperature within the range of about —60° to about 0° C.

5. A method as in claim 3 wherein a ketone is employed as the solvent and wherein the hydroperoxide is reduced at a temperature of about 0° to about 30° C.

6. A method which comprises the steps of contacting a polar organic solvent solution of from about 0.1 to about 10 mols per liter of solution of ω-(2'-formyl-2-biphenyl)-ω-methoxymethyl hydroperoxide with at least a chemically equivalent amount of a solvent soluble reducing agent at a temperature within the range of about —100° to about 30° C. to reduce said hydroperoxide to 2,2'-biphenyldicarboxaldehyde and recovering said dicarboxaldehyde, said solvent being selected from the class consisting of aliphatic $C_1$ to $C_{10}$ alcohols, ketones, and ethers.

7. A method as in claim 6 wherein the solvent is an alcohol and wherein the hydroperoxide is reduced at a temperature within the range of about —60° to about 30° C.

8. A method as in claim 6 wherein the solvent is a ketone and wherein the hydroperoxide is reduced at a temperature within the range of from about 0° to about 30° C.

References Cited in the file of this patent

UNITED STATES PATENTS

| | | |
|---|---|---|
| 1,423,980 | Williams | July 25, 1922 |
| 1,735,763 | Gaeger | Nov. 12, 1929 |
| 2,127,096 | Vollmann et al. | Aug. 16, 1938 |
| 2,673,217 | Hull | Mar. 23, 1954 |
| 2,786,076 | O'Connor et al. | Mar. 19, 1957 |

OTHER REFERENCES

Milas et al.: JACS, vol. 76, pages 2322–25 (1954).
Milas et al.: JACS, vol. 77, pages 2536–41 (1955).
O'Connor et al.: Ind. & Eng. Chem., vol. 49, No. 10, pages 1701–1702, October 1957.